(12) United States Patent
Ben Salah et al.

(10) Patent No.: US 10,968,120 B2
(45) Date of Patent: Apr. 6, 2021

(54) APPARATUS AND METHOD FOR ELECTRODISINFECTION

(71) Applicant: e2Metrix Inc., Sherbrooke (CA)

(72) Inventors: Ihsen Ben Salah, Sherbrooke (CA); Mohamed Laaroussi, Orford (CA)

(73) Assignee: e2metrix Inc., Sherbrooke (CA)

(*) Notice: Subject to any disclaimer, the term of this patent is extended or adjusted under 35 U.S.C. 154(b) by 0 days.

(21) Appl. No.: 15/772,129

(22) PCT Filed: Oct. 31, 2016

(86) PCT No.: PCT/CA2016/051265
§ 371 (c)(1),
(2) Date: Apr. 30, 2018

(87) PCT Pub. No.: WO2017/070798
PCT Pub. Date: May 4, 2017

(65) Prior Publication Data
US 2018/0319680 A1    Nov. 8, 2018

(30) Foreign Application Priority Data

Oct. 30, 2015 (CA) .............................. CA 2910853

(51) Int. Cl.
*C02F 1/46* (2006.01)
*C02F 1/467* (2006.01)
(Continued)

(52) U.S. Cl.
CPC .......... *C02F 1/467* (2013.01); *C02F 1/46109* (2013.01); *C02F 2001/46142* (2013.01);
(Continued)

(58) Field of Classification Search
CPC ............ C02F 1/467; C02F 2001/46142; C02F 2301/024; C02F 2303/04;
(Continued)

(56) References Cited

U.S. PATENT DOCUMENTS 4,761,208 A    8/1988 Gram et al.
2007/0023273 A1    2/2007 Kitaori et al.
(Continued)

FOREIGN PATENT DOCUMENTS

CA    2511091    9/2014
EP    2448868    1/2011
(Continued)

OTHER PUBLICATIONS

International Search Report (ISR) dated Feb. 2, 2017 in relation with the International Patent Application PCT/CA2016/051265.
(Continued)

*Primary Examiner* — Arun S Phasge
(74) *Attorney, Agent, or Firm* — Brouillette Legal Inc.; Robert Brouillette

(57) ABSTRACT

An electrolytic assembly and a method for the bacterial disinfection of water or wastewater is disclosed. Water circulating in cooling towers such as those that discharge heat from air conditioning; ships' ballast water; or wastewater with a dryness varying from 0.01 to 3%; can be treated. The assembly comprises one or more electrolytic units comprising at least one Dimensionnally Stable Anode commonly known as DSA, or a Boron Doped Diamond anode, also named BDD anode. The electrolytic treatment at least partially kill the bacteria present in the water. It has been shown that the electrolytic treatment breaks the cell membrane of bacteria present in the water. The treatment is particularly adapted for eliminating *Legionella* and others microorganisms, such as *E. coli*.

16 Claims, 7 Drawing Sheets

(51) Int. Cl.
  *C02F 1/461* (2006.01)
  *C02F 103/00* (2006.01)
  *C02F 103/02* (2006.01)

(52) U.S. Cl.
  CPC ........... *C02F 2001/46147* (2013.01); *C02F 2001/46171* (2013.01); *C02F 2103/008* (2013.01); *C02F 2103/023* (2013.01); *C02F 2201/4611* (2013.01); *C02F 2301/024* (2013.01); *C02F 2303/04* (2013.01)

(58) Field of Classification Search
  CPC .......... C02F 2201/4611; C02F 1/46109; C02F 2103/023; C02F 2103/008; C02F 2001/46171; C02F 2001/46147
  See application file for complete search history.

(56) References Cited

U.S. PATENT DOCUMENTS

| | | |
|---|---|---|
| 2008/0277274 A1 | 11/2008 | Kim et al. |
| 2014/0027271 A1 | 1/2014 | Berrak et al. |
| 2015/0144499 A1* | 5/2015 | Benedetto ............ C25B 1/26 205/413 |
| 2015/0251932 A1 | 9/2015 | Laaroussi et al. |

FOREIGN PATENT DOCUMENTS

| | | |
|---|---|---|
| WO | WO2007/140544 | 12/2007 |
| WO | WO2008/150541 | 12/2008 |
| WO | WO2014047726 | 4/2014 |

OTHER PUBLICATIONS

Cunha, B. A. (2010). Legionnaires' disease: clinical differentiation from typical and other atypical pneumonias. Infectious Disease Clinics of North America, 24 (1), 73-105. doi:10.1016/j.idc.2009.10.014.

Diao H. F., X. Y. Li, J. D. Gu, H. C. Shi et Z.M. Xie. 2004. « Electron microscopic investigation of the bactericidal action of electrochemical disinfection in comparison with chlorination, ozonation and Fenton reaction ». Process Biochemistry, vol. 39, p. 1421-1426.

Drees K. P., M. Abbaszadegan et R. M. Maier. 2003. « Comparative electrochemical inactivation of bacteria and bacteriophage ». Water Reasearch, vol. 37, p. 2291-2230.

Edelstein, P. H. (1988). Nosocomial Legionnaires' disease: a global perspective. The Journal of Hospital Infection, 11 Suppl A, 182-188.

Feng C., K. Suzuki, S. Zhao, N. Sugiura, S. Shimada et T. Maekawa. 2004. « Water disinfection by electrochemical treatment ». Bioressources Technologies, vol. 94, p. 21-25.

Foti, G., Gandini, D. and Comninellis, C. (1997) Anodic oxidation of organics on thermally prepared oxide electrodes. Curr. Top. Electrochem. 5, 71-91.

Matsunaga T, S. Naksono, T. Takamuku, J.G. Burgess, N. Nakamura et K. Sode. 1992. « Disinfection of drinking water by using a novel reactor employing carbon-cloth electrodes ». Applied Environmental Microbiology, vol. 58, p. 686-689.

Metcalf J., et A. Eddy. 2003 Wastewater Engineering, 4e éd. New York : McGraw-Hill. p. 1819.

Patermarakis G. et E. Fountoukidis. 1995. « Disinfection of water by electrochemical treatment ». Water Ressources, vol. 59, p. 753-755.

Prescott, L. M., J. P. Harley et A-D. Klein. 1993. Microbiologie, ère éd. française Bruxelle : De Boeck & Larcier, 1014 p.

Tijet, N., Tang, P., Romilowych, M., Duncan, C., Ng, V., Fisman, D. N., Jamieson, F., Low, D. E., & Guyard, C. (2010). New endemic Legionella pneumophila serogroup I clones, Ontario, Canada. Emerging Infectious Diseases, 16 (3), 447-454.

Tolentino-Bisneto R. et E. D. Bidoia. 2003. « Effect of the electrolytic treatment on Bacillus subtilis ». Brasilian Journal of Microbiology, vol. 34, p. 48-50.

Furuta et al.; "Legionella inactivation with diamond electrodes", Diamond & Reated Materals, Elsevier Science Publishers, Amsterdam, NL, vol. 13 No. 11-12, Nov. 1, 2004, pp. 2016-2019, ISSN 0925-9635, DOI: 10.1016/J.Diamond.2004.03.006.

* cited by examiner

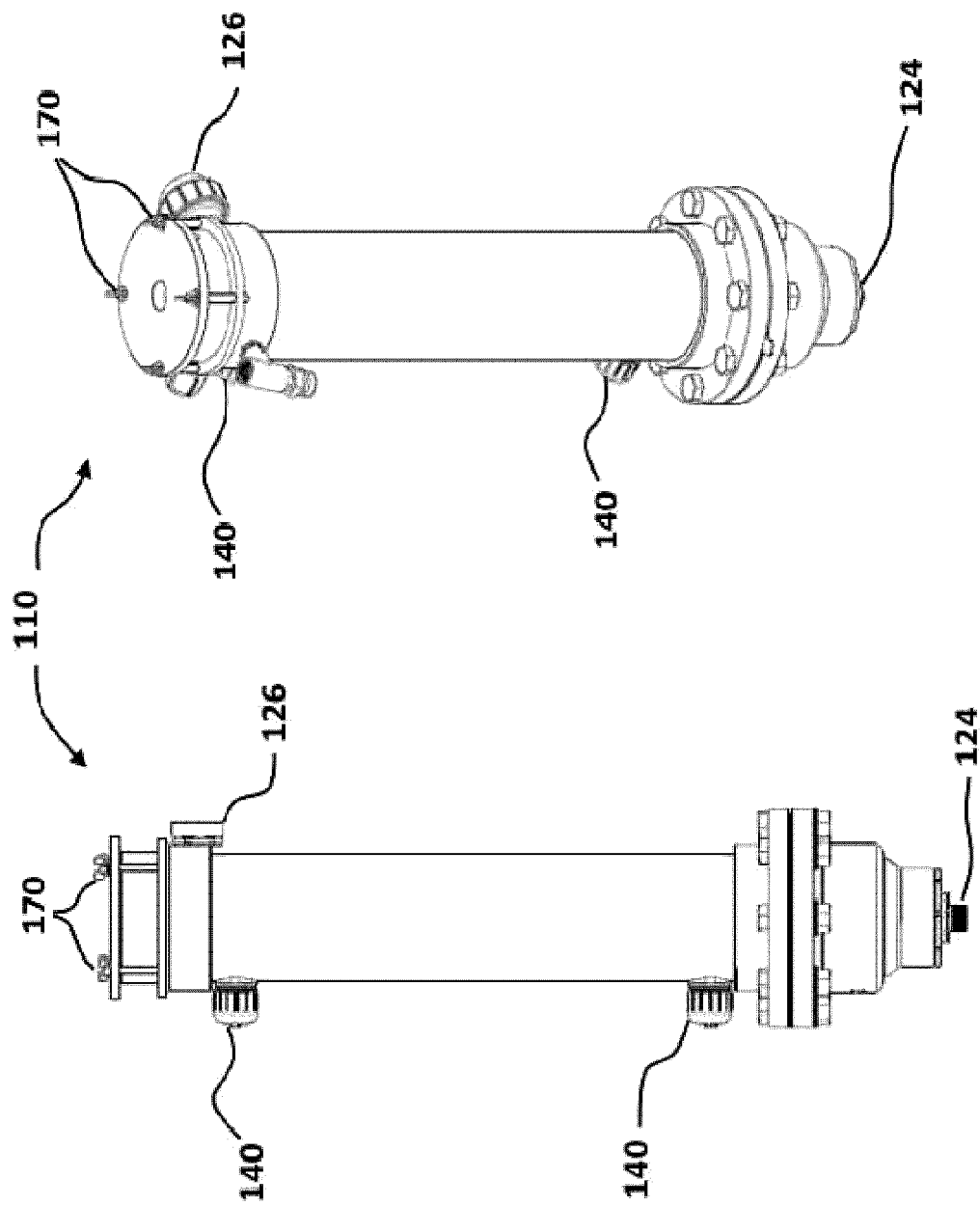

APPARATUS AND METHOD FOR ELECTRODISINFECTION

CROSS-REFERENCE TO RELATED APPLICATIONS

The present patent application claims the benefits of priority of commonly assigned Canadian Patent Application No. 2,910,853, entitled "Apparatus and Method For Electrodisinfection" and filed at the Canadian Intellectual Property Office on Oct. 30, 2015.

FIELD OF THE INVENTION

The present invention generally relates to an apparatus and method for electrodisinfection, such as for removing microorganisms from water.

BACKGROUND OF THE INVENTION

Disinfection methods can be divided into two main groups, namely physical and chemical processing methods (Metcalf and Eddy, 2003).

Physical methods include: electromagnetic radiation, ultrasonic waves, heat, visible light and ultraviolet (UV) radiation, ionizing radiation (gamma and X), electron beam and electric current.

Chemical methods use different compounds: especially halogens ($Cl_2$, $Br_2$, $I_2$, HOCl, OCl, $ClO_2$, HOBr, HOI, etc.), oxygenated and highly oxidizing compounds (ozone, hydrogen peroxide, phenols, alcohols, percarbonate and persulfate, peracetic acid, potassium permanganate, etc.), quaternary ammonium compounds, acids and bases, and enzymes.

The micro-organisms inactivating mechanisms comprise one or a combination of the following phenomena (Prescott, 1995):
1) disintegration of cell membranes (generates osmotic lysis),
2) Changes in membrane permeability,
3) Changing the nature of intracellular constituents,
4) Alteration of nucleic acids,
5) Interference with protein synthesis,
6) Induction of abnormal redox processes,
7) Inhibition of enzyme activity.

Disinfection is primarily determined by the ability of the bactericidal agent to oxidize and break the membrane and by its ability to diffuse into the cell. For example, chlorine diffuses into the cell and generates a malfunction of internal enzymes, inactivating the cell (Diao et al. 2004). Chlorine may also react with the constituents of the cell membrane. Otherwise, ozone is attributed to its high oxidation potential which directly causes degradation of the cell membrane and causes osmotic lysis. Produced hydroxyl radicals via the Fenton reaction will also degrade the cell membrane.

Persin and Rumeau (1989) already mentioned the importance of the electric field between the electrodes, which leads to the destruction of certain bacterial species. Using titanium electrodes, Patermarakis et al. (1995) confirmed this bactericidal effect without the formation of hypochlorous or other chlorine derivatives elements.

Different approaches exist to disinfect water. Some techniques use high voltage pulse currents for short periods of treatment while others use low energy during long processing time. Feng et al. (2004) conducted laboratory tests by the pulsed current application on a culture solution in closed recirculating systems, measured the abatement of *Legionella* bacteria and disinfection advance that is attributable to the effect of highly reactive free radicals (such as OH or ClO) generated during treatment with pulsed electric fields (1.0 and 1.5 kV to 5 kHz). The pulsed treatment generates more free radicals and is therefore more efficient. Microorganisms are inactivated by free radicals. Their membrane becomes permeable due to exposure to electric fields, which causes osmotic lysis by electroporation. Tolentino-Bisneto and Bidoia (2003) examined the effect of low current (0.6 A and 8 to 11 V) on *Bacillus subtilis* in water and suggest that the reduction also comes from the electroporation. According to Matsunaga et al. (1992), inactivation is produced by the electrochemical oxidation of coenzyme A. Drees et al. (2003) explain this phenomena by the oxidative stress generated by an irreversible permeabilization of cell membrane caused by the electric field inducing the electrochemical oxidation of critical cellular components. They mention that the electrolysis generates many oxidant in the presence of oxygen peroxide ($H_2O_2$) and ozone ($O_3$) and the chloride ($Cl_2$) and chlorine dioxide ($ClO_2$) when the chlorine ions ($Cl^-$) are here. Research suggests that these antimicrobial agents act synergistically on the inactivation of microorganisms. Drogui (2004) suggests that disinfection is partly due to the synergistic action of direct and indirect effects of electrolysis. Indeed, the direct action of free radicals generated at the anode causes oxidation of bacterial cells, whereas the indirect action is exerted via the oxidants generated in situ with $H_2S_2O_8$ and HClO.

In direct electrolysis, the pollutants are oxidized after adsorption on the anode surface without the involvement of any substances other than the electron, which is a "clean reagent". High electrochemical rates have been observed using noble metals such as Pt and Pd, and metal-oxide anodes such as iridium dioxide, ruthenium-titanium dioxide, and iridium-titanium dioxide (Foti et al. 1997).

The commonly accepted theories indicate that the reduction of microorganisms results in osmotic lysis of bacterial cells (Drogui et al 2004 and Feng et al 2004 cited supra). This bactericidal effect is caused by various phenomena including:
1) Oxidation of organic compounds of cell membrane by hydroxyl radicals generated at the anode,
2) Oxidation of organic compounds of cell membrane by free radicals from the Fenton reaction between the anode and the cathode, or
3) Oxidation of organic compounds of cell membrane by the ionization energy of the voltage gradient.

Microorganisms belong to five categories: bacteria, viruses, protozoa, fungi and helminths. Only some of them are said pathogens because they have the potential to cause illness. The quantities of pathogenic microorganisms vary depending on various parameters including: the nature of the collected waste (municipal, industrial . . . ), the amount of discharge treated, the health of the release and the type of treatment performed.

Microorganisms are present in all environments and are mostly able to withstand very adverse environmental conditions. For example, the bacteria must resist the osmotic pressure caused by the fact that their cytoplasm is strongly hypertonic relative to the external environment. Thus, the structure of the membrane cell is capable of withstanding osmotic pressures up to 20 bar (Prescott et al. 1995 cited supra).

Moreover, some bacteria, *Bacillus, Clostridium* and *Sporosarcina* expressed sporulating. They have the property of generating a protective cap that protects against dehydration and high temperatures. Viruses are protected from adverse conditions in their capsid or envelope. Depending of the different characteristics of microorganisms, the technology used for disinfection is variable.

Bacteria of the genus *Legionella* is a gram negative, strictly aerobic bacterium of the Legionellaceae family. It is found naturally in most fresh water sources, such as lakes and rivers.

It is also found in cooling towers, plumbing systems, water heaters, and warm water spas (Edelstein, 1988). *Legionella pneumophila* infection can cause a severe form of pneumonia, called Legionnaires' disease (Cunha, 2010). This bacterium is present worldwide. So infections are reported in all continents (Edelstein, 1988). The most common agent of Legionnaires' disease is *Legionella pneumophila* serogroup 1, which is the source of 61 to 88% of reported cases (Tij et et al., 2010).

A water cooling tower operates as a heat exchanger by direct contact between the water and the ambient air. Its effectiveness depends on the contact surface between the liquid element and air. To maximize the contact surface, the water is distributed as droplets in a stream of air passing through the tower thus the heat is dissipated into the ambient air and that the water is cooled. An amount of the water volume flowing through the apparatus is driven out by the fans. When this water is contaminated, the neighborhood is exposed to potentially infectious bacteria. So, three thresholds are introduced: <1000 CFU/L; between 1000 and 100 000 CFU/L and >100 000 CFU/L of *Legionella pneumophila* serogroup 1 and *Legionella pneumophila* serogroup 2-15. These three thresholds determine the quality of the circulating water in the tower. The last two thresholds require curative actions.

French researchers found that *Legionella* bacteria travelled up to 6 kilometres (3.7 mi) through the air from a large contaminated cooling tower at a petrochemical plant in Pas-de-Calais, France. That outbreak killed 21 of the 86 people who had a laboratory-confirmed infection. So, it's very important to treat water circulating into cooling towers to prevent disease caused by *Legionella* species.

In late September, 2005, 127 residents of a nursing home (Seven Oaks, Toronto, Canada) became ill with *Legionella pneumophila*. Within a week, twenty-one of the residents had died. Culture results at first were negative, which is not unusual as this bacteria is fastidious, meaning it leaves virtually no trace of itself. The source of the outbreak was traced to the air-conditioning cooling towers on the nursing home's roof.

A list of Legionnaires' diseases outbreaks is published on the Internet such as on: https://en.wikipedia.org/wiki/List_of_Legionnaires'_disease_outbreaks.

Besides treating the circulating cooling water in large industrial cooling tower systems to minimize scaling and fouling, the water should be filtered to remove particulates, and also be dosed with biocides and algaecides to prevent growths that could interfere with the continuous flow of the water.

Another very important reason for using biocides in cooling towers is to prevent the growth of *Legionella*, including species that cause Legionnaires' disease. The present invention has the ability to eliminate bacteria and microalgae simultaneously.

There is thus a need for a new apparatus and method for disinfection of waters, preferably applied to water used in cooling towers, or other types of waste waters, such as wastewater having a dryness of the influent from 0.01 to 3%; or ballast waters carried by ships, without the use of biocides or other chemical or biochemical agents.

LIST OF CITED DOCUMENTS

Cunha, B. A. (2010). Legionnaires' disease: clinical differentiation from typical and other atypical pneumonias. *Infectious Disease Clinics of North America*, 24 (1), 73-105. doi:10.1016/j.idc.2009.10.014.

Diao H. F., X. Y. Li, J. D. Gu, H. C. Shi et Z. M. Xie. 2004. «Electron microscopic investigation of the bactericidal action of electrochemical disinfection in comparison with chlorination, ozonation and Fenton reaction». Process Biochemistry, vol. 39, p. 1421-1426.

Drees K. P., M. Abbaszadegan et R. M. Maier. 2003. «Comparative electrochemical inactivation of bacteria and bacteriophage». Water Reasearch, vol. 37, p. 2291-2230.

Drogui P., M. A. Bureau, J. F. Blais et G. Mercier. 2004. «Electrochemical process for stabilisation and pre-conditioning municipal and industrial sewage sludge». En instance de brevet.

Edelstein, P. H. (1988). Nosocomial Legionnaires' disease: a global perspective. The Journal of Hospital Infection, 11 Suppl A, 182-188.

Feng C., K. Suzuki, S. Zhao, N. Sugiura, S. Shimada et T. Maekawa. 2004. «Water disinfection by electrochemical treatment». Bioressources Technologies, vol. 94, p. 21-25.

Foti, G., Gandini, D. and Comninellis, C. (1997) Anodic oxidation of organics on thermally prepared oxide electrodes. Curr. Top. Electrochem. 5, 71-91.

Matsunaga T, S. Naksono, T. Takamuku, J. G. Burgess, N. Nakamura et K. Sode. 1992. «Disinfection of drinking water by using a novel reactor employing carbon-cloth electrodes». Applied Environmental Microboilogy, vol. 58, p. 686-689.

Metcalf J., et A. Eddy. 2003 Wastewater Engineering, 4e ed. New York: McGraw-Hill. P. 1819.

Patermarakis G. et E. Fountoukidis. 1995. «Disinfection of water by electrochemical treatment». Water Ressources, vol. 59, p. 753-755.

Persin F. et M. Rumeau (1989). Le traitement electrochimique des eaux et effluents. Tribune del'Eau 42.45-56.

Prescott, L. M., J. P. Harley et A-D. Klein. 1993. Microbiologie, 1ére éd. française Bruxelle: De Boeck & Larcier, 1014 p.

Tijet, N., Tang, P., Romilowych, M., Duncan, C., Ng, V., Fisman, D. N., Jamieson, F., Low, D. E., & Guyard, C. (2010). New endemic *Legionella pneumophila* serogroup I clones, Ontario, Canada. *Emerging Infectious Diseases*, 16 (3), 447-454.

Tolentino-Bisneto R. et E. D. Bidoia. 2003. «Effect of the electrolytic treatment on *Bacillus subtilis*». Brasilian Journal of Microbiology, vol. 34, p. 48-50.

SUMMARY OF THE INVENTION

The shortcomings of the prior art are generally mitigated by an apparatus and method for electrodisinfection of water, such as but not limited to water circulating in a cooling tower such as a cooling tower installed on or near buildings to discharge heat from air conditioning, or wastewater, such as wastewater having a dryness of the influent from 0.01 to 3%; or ballast water carried by ships.

The assembly comprises at least one electrolytic units comprising at least one stable anode (i.e. that is not consumed during electrolyse), commonly known as Dimensionnally Stable Anode or DSA. The DSA preferably consists of a titanium base metal covered by a thin conducting layer of iridium dioxide. Boron doped diamond (BDD) anodes may also be used.

The invention is first directed to an electrolytic apparatus assembly for the electro-disinfection of water. The apparatus comprises:
- at least one vertical electrolytic unit, each unit comprising:
  - a vertical tubular reactor having a bottom section and a top section,
  - an inlet adjacent to the bottom section of the reactor for injecting water to be treated into the reactor,
  - an outlet adjacent to the top section of the reactor for extracting the water from the reactor, and
  - at least one anode and at least one cathode located inside the reactor and configured to be operatively connected to an electric power supply providing a continuous current to the anode(s) and cathode(s) to electrolyse the water flowing inside the reactor for at least partially kill bacteria present in the water,
- wherein each anode is a Dimensionnally Stable Anode, also named DSA; or a Boron Doped Diamond anode, also named BDD anode; and
- a pump unit operatively connected to the inlet for injecting the water to be treated into the reactor.

According to a preferred embodiment, the anodes are DSAs comprising a titanium metallic base covered by a conducting layer of iridium dioxide.

According to a preferred embodiment, the anodes are BDD anodes.

According to a preferred embodiment, the vertical electrolytic reactor defines an electrolysation chamber extending from the top of the reactor and containing the anode(s) and cathode(s) substantially parallel to a flow of the water created from the bottom to the top of the reactor when the water is injected into the reactor; and a flow dispersion chamber located below the electrocoagulation chamber and in fluid communication with the inlet.

According to a preferred embodiment, the electrolytic apparatus assembly comprises a number M of anodes, with M being 3, 6, 9, 12 or 15, being rods. Preferably, the rods are operatively connected to one or two crown member to form an electrode cartridge. The crown members are configured to be operatively connected to the power supply. The top crown member is also configured to seal the top section of the vertical tubular reactor once the electrode cartridge is inserted into the reactor, the electrode cartridge being removable from the reactor for the maintenance of the anodes and cathode.

According to a preferred embodiment, the vertical tubular reactor is configured to form a second tubular cathode about the anodes. Alternatively, the electrode can extend from the inside wall of the tubular reactor.

According to a preferred embodiment, the power supply provides a current with an amperage between 10 A and 80 A, corresponding to 6V and 40V respectively, in order to reduce a treatment time of the water.

According to a preferred embodiment, the electrolytic apparatus assembly comprises a number N of electrolytic vertical units with N≥2, and disposed in a parallel configuration to form a modular unit of N reactors, the outlet of the $(N-1)^{th}$ electrolytic unit being fluidly connected to the inlet of the $N^{th}$ electrolytic unit, the number N being selected in accordance with a volume of water to be treated. The number N can be 2, 3 or 4, and even more than 4 if need be.

According to a preferred embodiment, the pump unit is fluidly connected to a cooling tower in order to extract and treat water that have previously circulated within the cooling tower; the outlet of the reactor being optionally fluidly connected to the same cooling for re-injecting the water into the cooling tower after treatment.

The invention is also directed to the use of the electrolytic apparatus assembly as defined herein, for the electro-disinfection of water from a cooling tower, such as, but not limited to the water contains *Legionella* and/or *E. coli* bacteria.

The invention is also directed to the use of the electrolytic apparatus assembly as defined herein, for the electro-disinfection of aquatic species carried in ships' ballast water. For instance, the aquatic species may comprise bacteria or microbes, micro-algae, or various life stages of aquatic plant and animal species.

The invention is also directed to the use of the electrolytic apparatus assembly as defined herein, for the electro-disinfection of wastewater having a dryness of from 0.01 to 3%.

The invention is also directed to the use of method for the electro-disinfection of water extracted from a cooling tower containing bacteria, such as, but not limited to *Legionella* and/or *E. coli* bacteria. The method comprises the steps of:
a) injecting the water to be treated into an electrolytic apparatus assembly comprising at least one Dimensionnally Stable Anode or DSA, or Boron a Doped Diamond, also named BDD anode, the water having previously circulated in the cooling tower prior to be injected into the electrolytic apparatus assembly;
b) performing an electrolytic treatment of the water circulating into the electrolytic unit assembly for at least partially kill the bacteria; and
c) optionally, re-injecting the water once treated into the cooling tower.

The invention is also directed to the use of an electrolytic apparatus assembly comprising a Dimensionnally Stable Anodes or DSA for the electro-disinfection of water or wastewater. Preferably, the water to electro-disinfect is water circulating in a cooling tower and containing bacteria, such as *Legionella* and/or *E. coli*. The present invention has the ability to eliminate bacteria and microalgae simultaneously. The use of biocides and additional filter is eliminated in cooling towers to prevent the growth of *Legionella*, including species that cause Legionnaires' disease, is eliminated.

Alternatively, the water may be ships' ballast water containing aquatic species, such as bacteria or microbes, microalgae, or various life stages of aquatic plant and animal species.

Alternatively, the DSA allows the electro-disinfection of wastewater, such as the wastewater having a dryness of from 0.01 to 3%.

Preferably, the present invention uses amperages between 10 A and 80 A, corresponding to 6V and 40V respectively, in order to reduce treatment time.

It has been shown that the electrolytic treatment breaks the cell membrane of bacteria present in the water. The treatment is particularly adapted for eliminating bacteria such as *Legionella* and/or *E. coli*.

Since 1989, Davis et al. demonstrated the effect of increasing microamperage (10 to 400 μA) on bacterial growth reduction and killing, within a period of two days.

Other and further aspects and advantages of the present invention will be better understood by reading the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other objects, features and advantages of the invention will become more readily apparent from the following description, reference being made to the accompanying drawings in which:

FIG. 3 is a front view of the exterior view of an electrodisinfection reactor in accordance with at least one embodiment of the invention;

FIG. 4 is a perspective view of the electrodisinfection reactor illustrated on FIG. 2;

DETAILED DESCRIPTION OF THE PREFERRED EMBODIMENT

Figure 1:
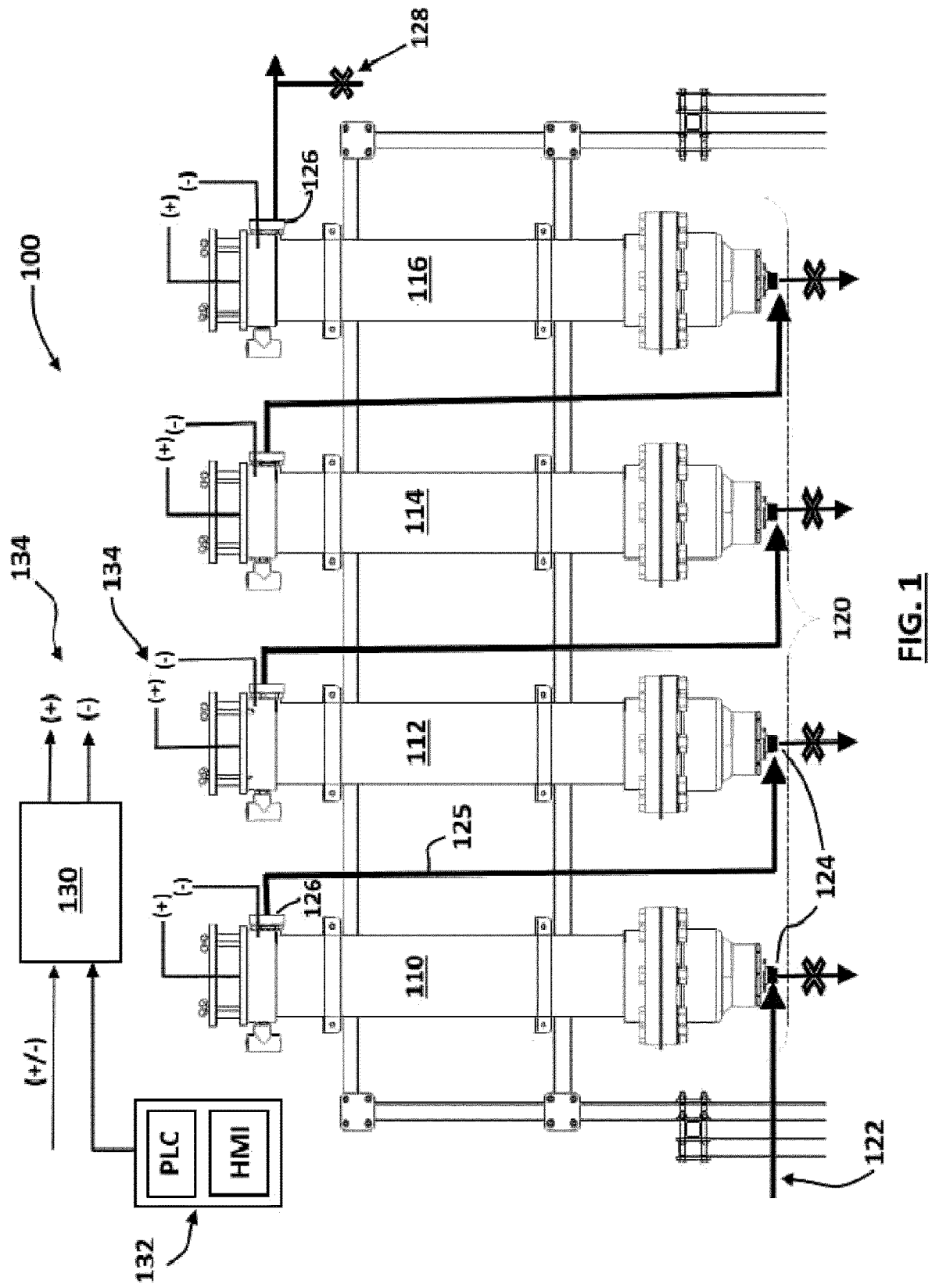
FIG. 1 is a schematic illustration of a modular unit of electrolysis reactors in accordance with at least one embodiment of the invention.
Figure 2A:
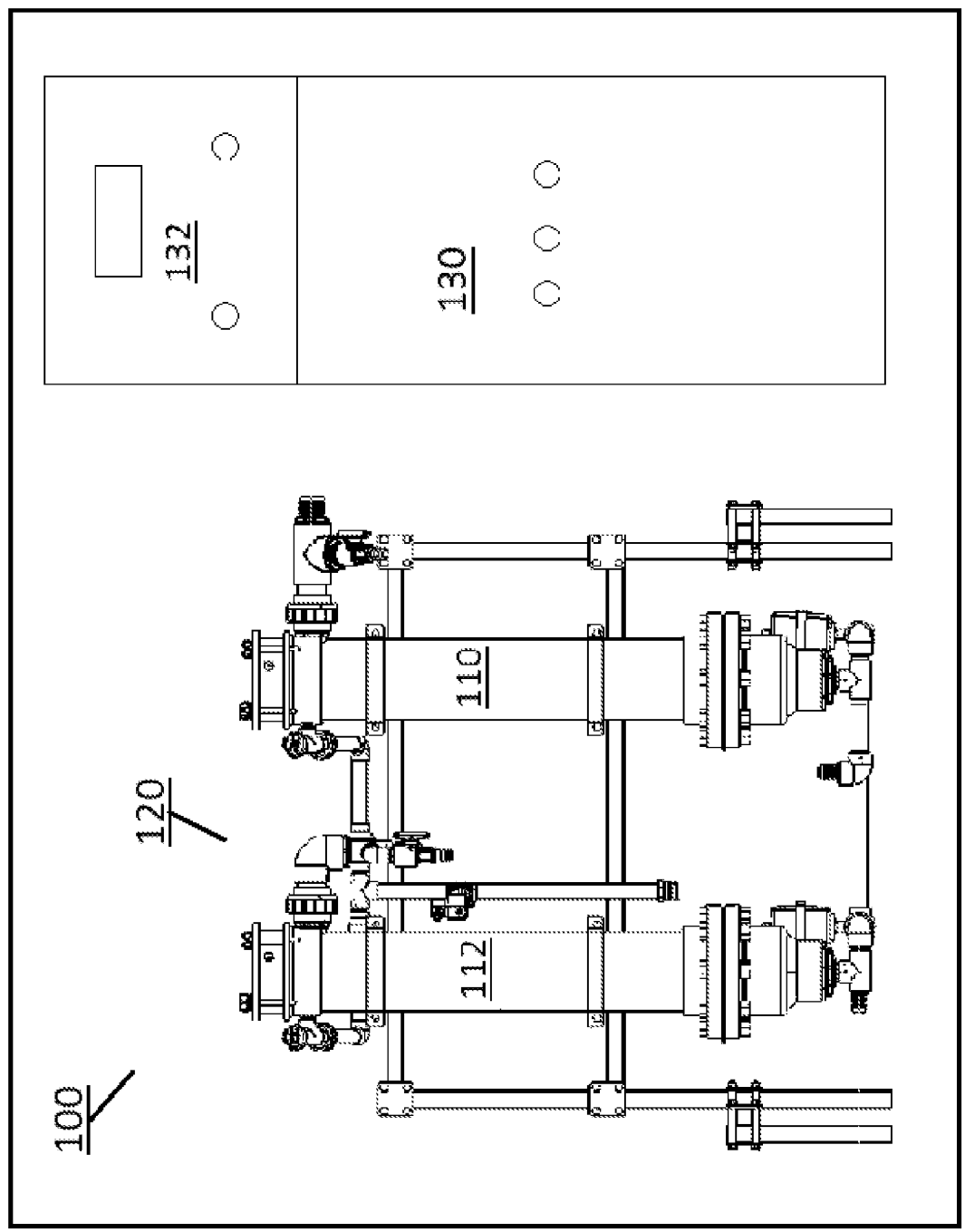
FIGS. 2A and 2B are pictures showing the system for treating water from a cooling tower in accordance with a preferred embodiment of the invention.
Figure 2B:
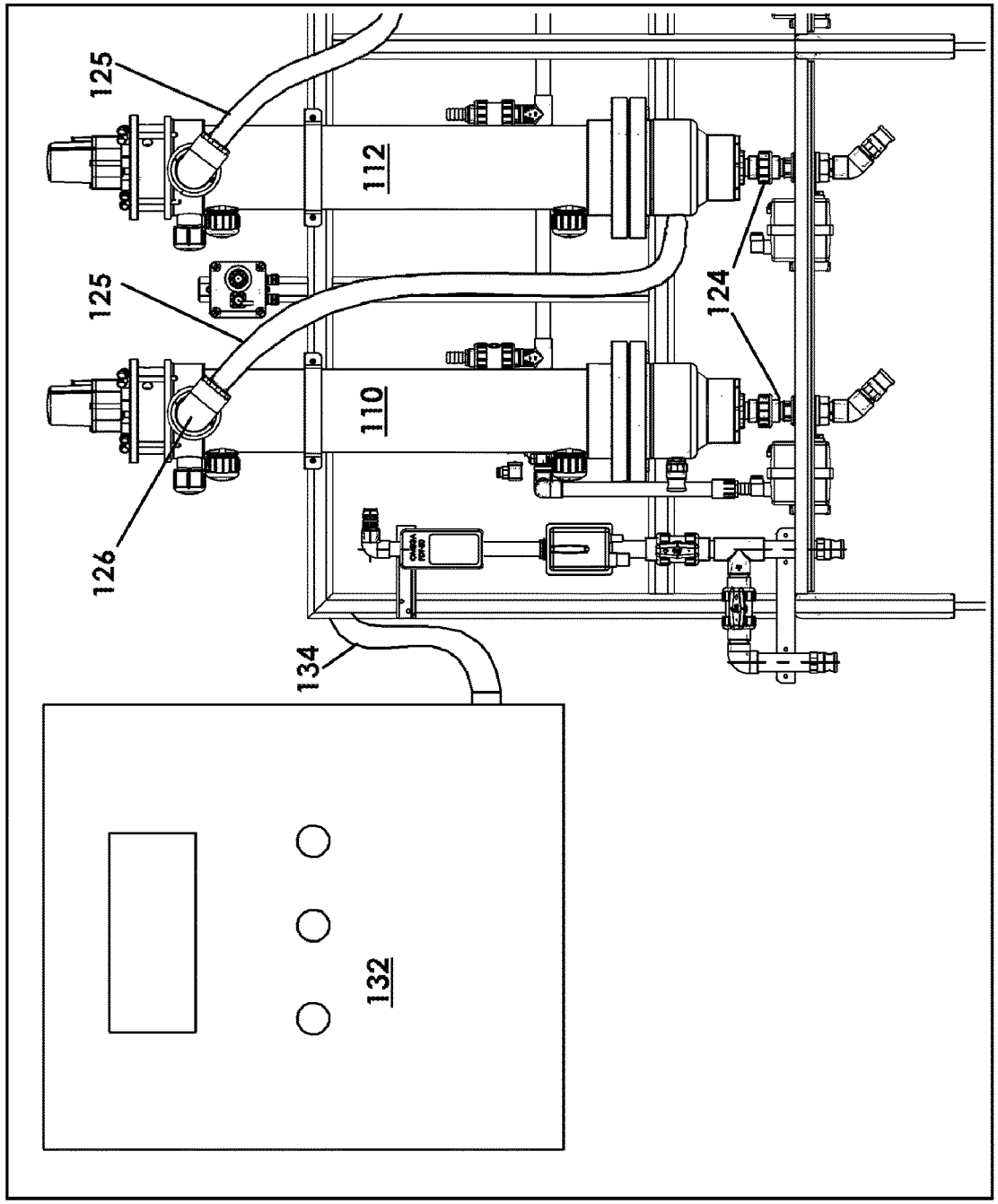

In the present embodiment, now referring to FIGS. 1 and 2, a system 100 comprising a plurality of electrodisinfection reactors 110-116 is shown. In these embodiments, the reactors are arranged in a modular arrangement or configuration to make up an electrolysis unit 120. In the embodiment illustrated in FIG. 1, four electrolysis reactors are arranged in a single unit 120. In FIG. 2, two electrolysis reactors are arranged in a single unit 120. It has to be understood that the number of reactors required for treatment of fluid, will be a function of the dosage that must be applied to the concentration of microorganisms to be destroyed. Moreover, the design may be optimized with respect to other process steps and with respect to the working conditions that are being used.

In another embodiment, a unit could potentially comprise 1, 2, 3, 4, 5, or even more reactors. Likewise, it is possible to have more than one unit depending on the extent of the treatment required by the fluid. Accordingly, multiple reactors and/or multiple units could be installed to achieve the objectives of disinfection. The actual configuration of the reactors in each unit may also vary and is typically left to the discretion of the client, depending on specifications and constraints such as the available footprint.

Each reactor of the unit 120 are electrically powered with a power supply system 130 providing a continuous current 134. The power supply system may be controlled by a control panel 130, including a Programmable Logic Controller (PLC) and a Human Machine Interface (HMI).

As illustrated on FIG. 1, the first reactor 110 is fed with the influent 122 to be treated via an inlet 124 located at the bottom of the reactor. The influent exits the reactor via an outlet 126 located at the top of the reactor 110 before entering via the inlet 124 of the second reactor 112. As shown on FIG. 2B, the reactors 110-112 are connected with flexible tubes 125. The same influent connections repeat with the third and fourth reactors (114, 116) before exiting the fourth reactor 116 via the outlet 126. A valve 128 at the exit of the unit 120 can be turned off if necessary. Each reactor has a valve 118 connected to the inlet 124 to purge the reactor when needed.

Now referring to FIGS. 2, 3 and 4, the exterior of an electrolysis reactor is shown. Internal conceptions of the reactors are as those presented in the Applicants' patent application published as US 2014/0027271 A1 or US2015/0251932 A1, the content of these applications being incorporated herein by reference.

According to an embodiment to the present invention, the system may also comprise two high temperature switches 140, one at the top and one at the bottom of the reactor, generally used to prevent overheating of the electrolysis reactors 110 in no-flow or in low-flow conditions. The high temperature switches are generally connected to a security relay installed in the control panel 130. In the event that one of the high temperature switches is activated due to a rise in temperature in the reactor beyond a pre-defined temperature setting, the security relay shall turn off the system and the corresponding DC power supply in order to prevent the overheating of the reactor.

Still referring to FIGS. 3 and 4, the reactor is fed from an inlet 124 preferably located at the bottom of the reactor. The effluent 129 may exit the reactor 110 via an outlet 126 preferably located at the top of the reactor. As illustrated on FIG. 5, the reactor may be adapted to provide turbulent or transition type of flow rate in order to ensure a continuous cleaning of the anode(s) and cathode(s) (see also US2015/0251932 A1 cited above for more details). When quick-loading electrode cartridges are used, the reactor 110 further comprises quick-tightening bolts 170 to secure the loading top of the reactor.

Figure 5:
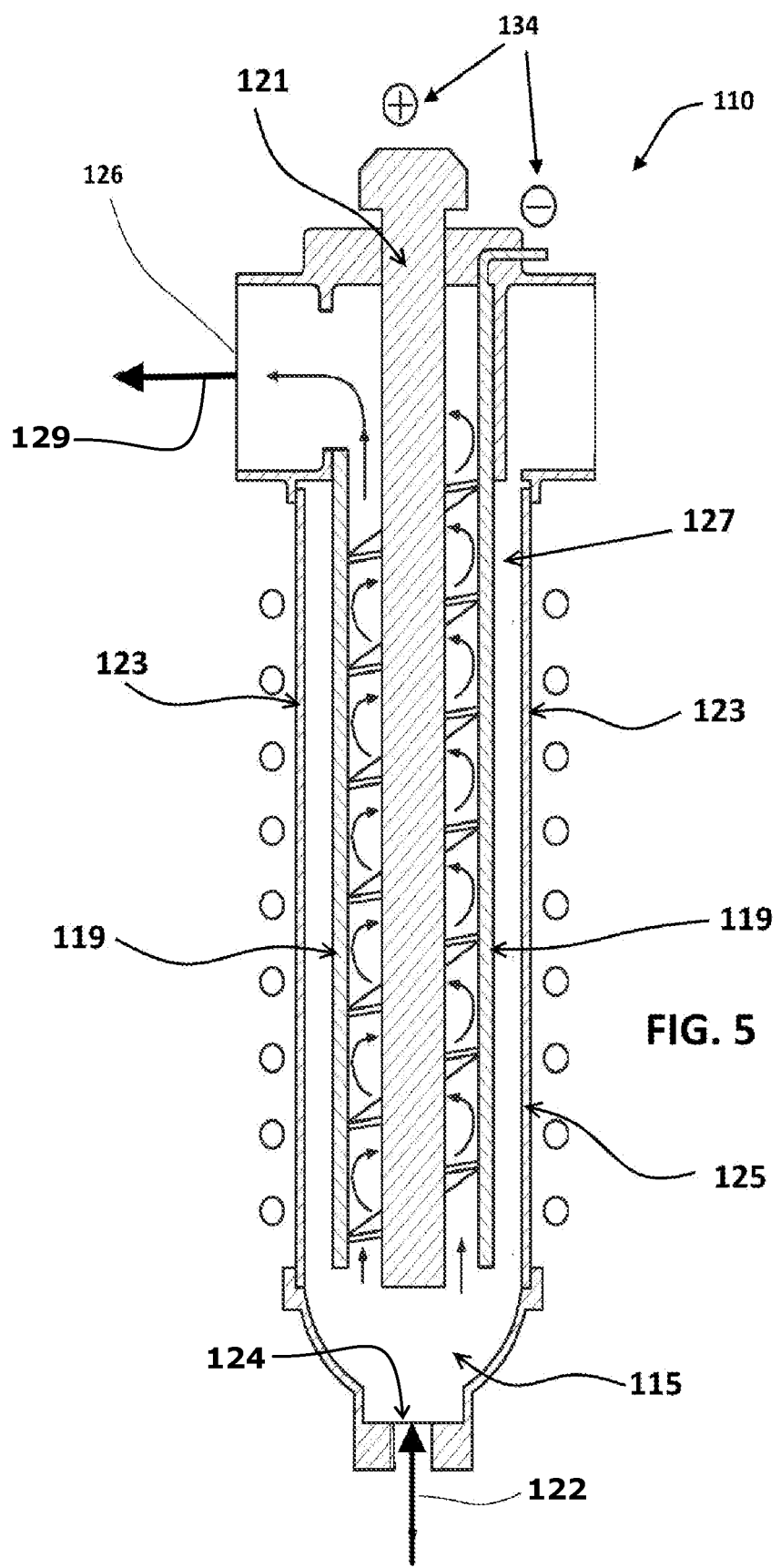
FIG. 5 is a schematic illustration of the interior view of an electrodisinfection reactor in accordance with at least one embodiment of the invention.

Now referring to FIG. 5, the interior of an electrolysis reactor 110 according to another preferred embodiment is shown. Above the inlet port 124 at the bottom of the reactor 110 is generally a flow dispersion chamber 115 that helps distributing the rising flow in an evenly fashion throughout the cross-sectional area 117 between the anode(s) 119 and the cathode(s) 121-123. The external cathode 123 can extend from the external wall of the reactor 125 or being the wall itself. Such a configuration is desired to make sure the fluid is forced through the reactive areas. As such, the only way for the fluid to make its way out of the reactor is by passing through the reactive zone of the reactor, also named electrolytic chamber 127, thereby being subjected to the electrolysis reaction. In such a configuration, no bypass is possible. Consequently, this configuration ensures that all the fluid is exposed to the electrolysis treatment.

Figure 6:
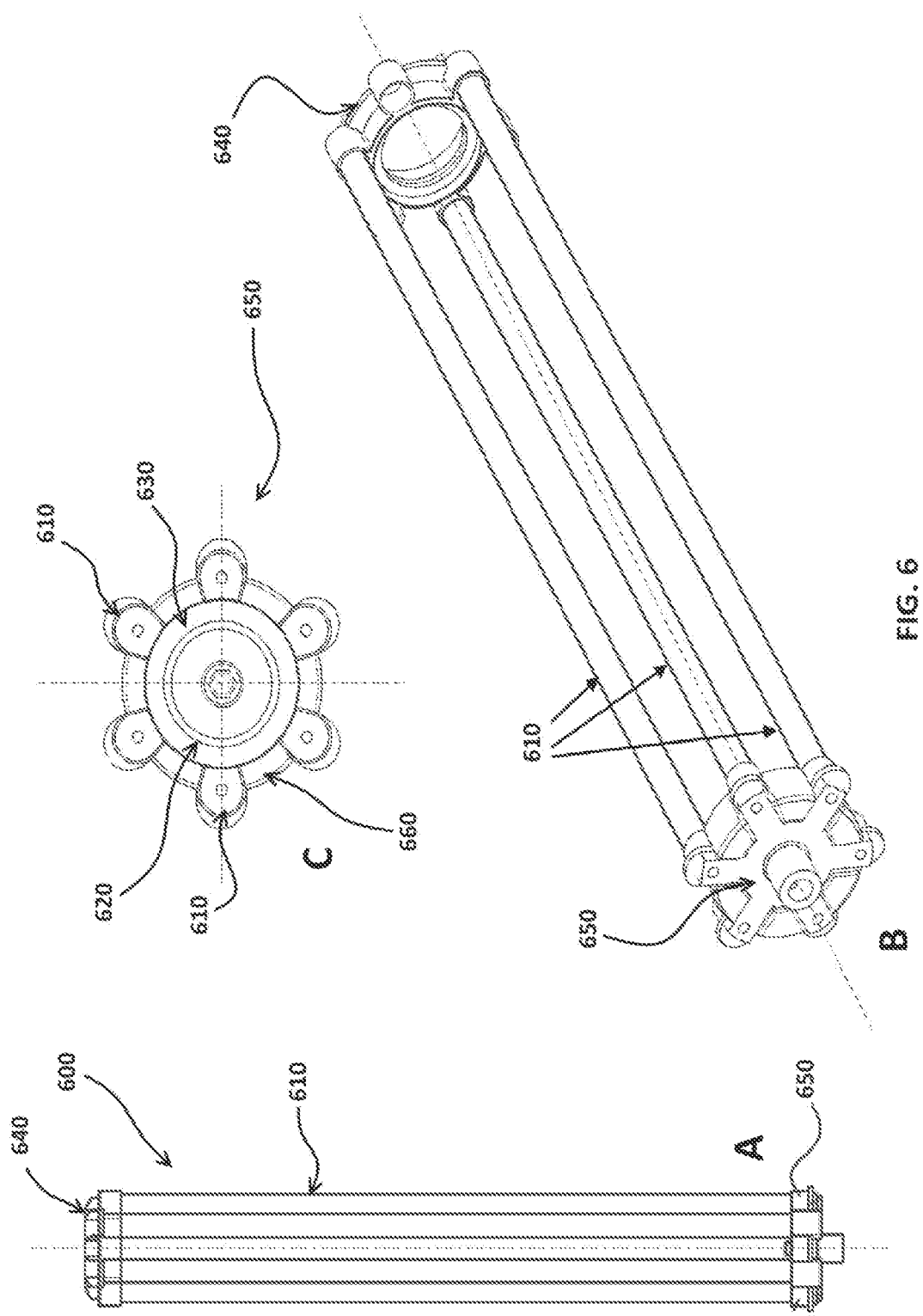
FIG. 6 are schematic illustrations of the typical concentric arrangement of anodes and cathodes in an electrolysis reactor in accordance with at least one embodiment of the invention.

Now referring to FIG. 6, a cartridge 600 of six DAS or BOD anode rods 610 is illustrated. The rods 610 are generally inserted between an inner cathode 620 and an outer cathode 125 extending from the vertical tubular housing of the reactor (see FIG. 5). The gap 630 between anodes and cathodes where the fluid is allowed to pass and where it serves as a conductor between the two types of electrodes, allows for the electrolysis treatment to occur. This concentric arrangement between anodes and cathodes is typical of this electrolysis method.

The DAS or BDD rods 610 extends from a top and bottom crown members 640-650. The crown members and rods form the cartridge 600. A nonconductive material 660 can be inserted between the rods for the sake of security.

Figure 7:
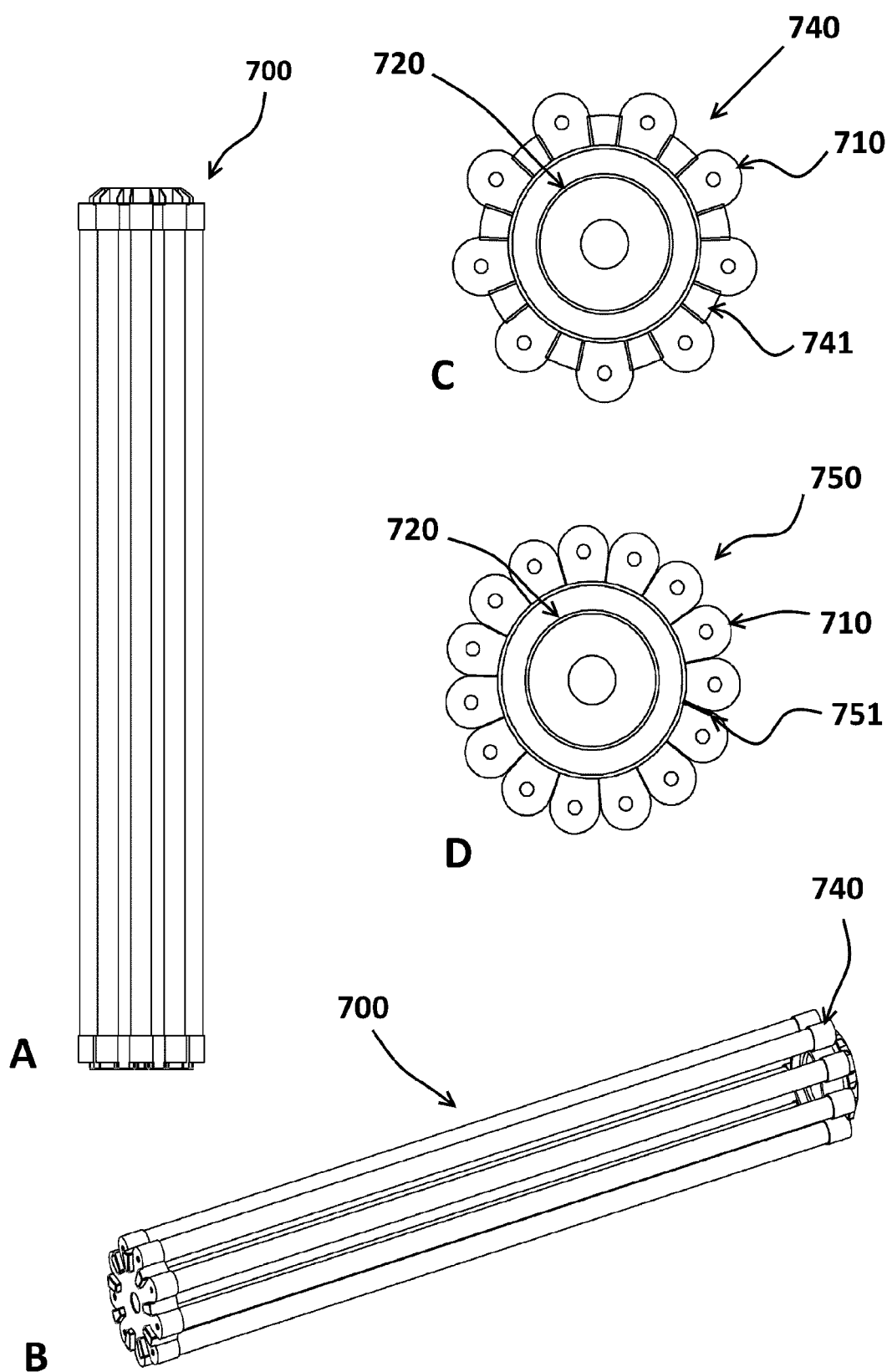
FIG. 7 are schematic illustrations of the typical concentric arrangement of anodes and cathodes in an electrolysis reactor in accordance with at least one embodiment of the invention.

Now referring to FIG. 7, it is shown quick-loading electrode replacement cartridges that can be typically inserted into the body of the reactor having nine (9) rods (A, B and C) or fifteen (15) rods (D), and in each case a central cathode 720. Anodes and cathode extend from the crown members 740 or 750. FIG. 7 (C) shows a crown member 740 having 9 rods extending therefrom separated by an isolating member 741, whereas FIG. 6 (D) shows a crown member 750 having 15 rods extending therefrom separated by an isolating member 751.

Moreover, electrical connections for the DC power supply to the electrical distribution rings (one for the cathodes and one for the anodes) are generally made at the top or the reactor, through a pair of circular holes that are drilled into the water-tight crown (see US 2015/0251932A1 for details). Various instruments may be installed in the system in order to monitor or control process parameters, such as pH, temperature, conductivity, and turbidity.

According to an embodiment of the present invention, the design of the reactor may perform efficiently for treating solutions characterized by a relatively wide range of conductivity values. Design optimization of the reactor, such as the use of more than one cathode, the use of a larger useful anode area, or the use of a tighter inter-electrodes gap can gear the reactor for treatment in a lower conductivity fluid. The method according to the present invention is therefore flexible enough to be suited for disinfection in fresh water, brackish water, salt water environment or any kind of water susceptible to transport bacteria, germs, microalgae or any kind of potentially lethal microorganisms.

According to one preferred embodiment of the invention, the apparatus comprises anodes which are commonly named Dimensionnally Stable Anode (or DSA). DSA are generally made of a metal support (here titanium) on which a conducting coating of iridium dioxide is applied. Titanium is generally selected for its excellent corrosion resistance related to chlorides allowing water disinfection treatment without any material risk of contamination or any substantial loss in overall product quality.

The method of electrolysis according to the present invention could be performed in a single pass or through multiple passes through the unit of reactors. A unit of automated ON/OFF valves may be used to direct the fluid in a loop so that it effectively passes multiple times through the unit of reactors until the treatment is completed. The flow rate in the treatment loop and through the reactors may be controlled to optimize the treatment, and to maintain the optimal flow rate when performing electrolysis in the reactor. The flow rate in the treatment loop may also be adjusted by sizing the feed pump accordingly and through the use of an automatically controlled and modulating valve and the inlet of the feed line. Once the electrolysis treatment is completed, this modulating valve, as well as the other ON/OFF valves can be controlled to stop the treatment.

According to an embodiment to the present invention, the method generally uses a flow control module in order to ensure that a transition or turbulent flow regime is maintained in the reactor throughout the treatment process. In addition, the type of flow regime will impact the collision rate in the fluid. The turbulent flow regime will generally promote the collision rate between different particles thereby increasing the kinetic energy of the fluid during electrolysis, while allowing cleaning up the surface of the anode(s) and cathode(s) on a continuous basis.

According to one embodiment, the apparatus for disinfection may also comprise a feed tank equipped with level sensors and control instruments, a flow meter and an automated and modulating valve on the feed line, a modular unit of electrolysis reactors fed from the bottom and each loaded with a quick replacement electrodes cartridge, if needed.

Table 1 shows the results of domestic water treatment with ECOTHOR™, with DSA anodes. While Table 2 shows the results with ANO2M anodes. Table 3 is obtained after water treatment in a cooling tower with ECOTHOR, with DSA anodes. Table 4 is the continuity of Table 3 showing additional results obtained after 30 Sep. 2015 using a pilot installed in a hospital.

TABLE 1 results of domestic water treatment with ECOTHOR ™, with DSA anodes:

| | DSA | |
|---|---|---|
| E. Coli | Raw (UFC/100 ml) | Treated (UFC/100 ml) |
| 15 Sep. 2015 | 20000 | <10 |
| 7 Oct. 2015 | >60000 | 27 |

TABLE 2 the results with ANO2M anodes

| | ANO2M | |
|---|---|---|
| E. Coli | Raw (UFC/100 ml) | Treated (UFC/100 ml) |
| 27 Jul. 2012 | 53000 | <10 |
| 4 Sep. 2012 | 4700000 | <10 |

TABLE 3

Results obtained after water treatment in a cooling tower with ECOTHOR, with DSA anodes:

| | DSA | | | |
|---|---|---|---|---|
| | Raw 14-08-15 (UFC/1 L) | Treated 4 sept. 15 (UFC/1 L) | Treated 15 sept. 15 (UFC/1 L) | Treated 30 sept. 15 (UFC/1 L) |
| Legionella spp. | 10000 | <3000 | <3000 | <3000 |
| Legionella pneumophila serogroupe 1 | | <3000 | <3000 | <3000 |
| Legionella pneumophila serogroupe 2-15 | | <3000 | <3000 | <3000 |

*Detection limit of the method: 3000 UFC/L

TABLE 3

Results obtained after water treatment in a cooling tower with ECOTHOR, with DSA anodes:

| | Results | | |
|---|---|---|---|
| Date | Legionella pneumophila (UFC/L) | Standard (UFC/L) | Legionella spp. (UFC/L) |
| 2015 Oct. 4 | <3000 | 10000 | <3000 |
| 2015 Oct. 14 | <3000 | 10000 | <3000 |
| 2015 Oct. 21 | <3000 | 10000 | <3000 |
| 2015 Oct. 29 | <3000 | 10000 | <3000 |
| 2015 Nov. 3 | <3000 | 10000 | <3000 |
| 2015 Nov. 10 | <3000 | 10000 | <3000 |
| 2015 Nov. 16 | <3000 | 10000 | <3000 |
| 2015 Nov. 26 | <3000 | 10000 | <3000 |
| 2015 Nov. 30 | <3000 | 10000 | <3000 |

TABLE 3-continued

Results obtained after water treatment in a cooling tower with ECOTHOR, with DSA anodes:

| Date | Legionella pneumophila (UFC/L) | Standard (UFC/L) | Legionella spp. (UFC/L) |
|---|---|---|---|
| 2015 Dec. 8 | <3000 | 10000 | <3000 |
| 2015 Dec. 15 | <3000 | 10000 | <3000 |
| 2016 Jan. 4 | <3000 | 10000 | <3000 |
| 2016 Jan. 12 | <3000 | 10000 | 3000 |
| 2016 Jan. 19 | <3000 | 10000 | <3000 |
| 2016 Jan. 25 | <3000 | 10000 | <3000 |
| 2016 Feb. 1 | <3000 | 10000 | <3000 |
| 2016 Feb. 10 | <3000 | 10000 | <3000 |
| 2016 Feb. 16 | <3000 | 10000 | 3000 |
| 2016 Feb. 23 | <3000 | 10000 | <3000 |
| 2016 Feb. 29 | <3000 | 10000 | <3000 |
| 2016 Mar. 9 | <3000 | 10000 | <3000 |
| 2016 Mar. 15 | <3000 | 10000 | <3000 |

Disinfection of Wastewater or Muds

The present invention is further directed to a system and a method for the bacterial disinfection of wastewater, such as wastewater having a dryness of from 0.01 to 3%. The system is the same as illustrated in the Figures used for the disinfection of water from a cooling tower.

Wastewater, such as water from industrial, commercial, agricultural or merely domestic sources contains solid particles. Dryness content (or "siccité" in French) of a mud is the weight ratio between the weight of solid matter (Ms) contained in the mud and the total weight, ad expressed in percentage (%):

$$\frac{Ms}{Mw + Ms} * 100$$

Watewater having a dryness content from up to 10% is defined as a liquid mud. The present invention is particularly adapted for disinfecting wastewater having a dryness content up to 3%.

The method comprises at least the steps of:
a) injecting the wastewater into an electrolytic unit comprising at least one Dimensionnally Stable Anode or DSA; and
b) performing an electrolytic treatment of the wastewater circulating into the electrolytic unit for at least partially kill bacteria present in the water.

The invention is also directed to the use of an electrolytic unit as disclosed herein or the use of a Dimensionnally Stable Anode or DSA for disinfecting an influent of wastewater or mud, the dryness of which being up to 10%, preferably up to 5%, more preferably up to 3%, much more preferably from 0.01 to 3%.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the scope of the appended claims.

Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An electrolytic apparatus assembly for the electro-disinfection of water from a cooling tower, the apparatus comprising:
   at least one vertical electrolytic unit, each unit comprising:
      a vertical tubular reactor having a bottom section and a top section,
      an inlet adjacent to the bottom section of the reactor for injecting water to be treated into the reactor,
      an outlet adjacent to the top section of the reactor for extracting the water from the reactor,
      a plurality of anodes being rods extending longitudinally from the top section of the reactor inside the reactor;
      at least one cathode located inside the reactor; the plurality of anodes and the at least one cathode being configured to be operatively connected to an electric power supply providing a continuous current to the anodes and the at least one cathode to electrolyze the water flowing inside the reactor for at least partially kill bacteria present in the water;
      wherein each anode is a Dimensionnally Stable Anode (DSA); and
   a pump unit operatively connected to the inlet for injecting the water to be treated into the reactor, wherein the pump unit is fluidly connected to the cooling tower in order to extract and treat water that have previously circulated within the cooling tower; the outlet of the reactor being fluidly connected to the same cooling tower for re-injecting the water into the cooling tower after treatment, the electrolytic apparatus assembly and the cooling tower forming a treatment loop.

2. The electrolytic apparatus assembly of claim 1, wherein each DSA anode comprises a titanium metallic base covered by a conducting layer of iridium dioxide.

3. The electrolytic apparatus assembly of claim 1, wherein:
   the vertical electrolytic reactor defines an electrolysation chamber extending from the top of the reactor and containing the anodes and the at least one cathode substantially parallel to a flow of the water created from the bottom to the top of the reactor when the water is injected into the reactor; and
   a flow dispersion chamber located below the electrocoagulation chamber and in fluid communication with the inlet.

4. The electrolytic apparatus assembly of claim 1, wherein the vertical tubular reactor is configured to form the at least one cathode, or the at least one cathode extends from an inner wall of the vertical tubular reactor.

5. The electrolytic apparatus assembly of claim 1, comprising a number M of said plurality of anodes being rods, with M being 3, 6, 9, 12 or 15, the rods surrounding a central cathode.

6. The electrolytic apparatus assembly of claim 5, wherein the rods and the central cathode are operatively connected to a top crown member to form an electrode cartridge, the crown member being configured to be operatively connected to the power supply and to seal the top section of the vertical tubular reactor once the electrode cartridge is inserted into the reactor, the electrode cartridge being removable from the reactor for the maintenance of the anodes and cathode.

7. The electrolytic apparatus assembly of claim 6, wherein the cartridge also comprises a bottom crown member configured to maintain the anodes and the central cathode that extend therefrom, the bottom crown member being configured to be inserted inside the vertical reactor.

8. The electrolytic apparatus assembly of claim 1, wherein the power supply provides a current with an amperage between 10 A and 80 A, corresponding to 6V and 40V respectively, in order to reduce a treatment time of the water.

9. The electrolytic apparatus assembly of claim 1, comprising a number N of electrolytic vertical units with N≥2, and disposed in a parallel configuration to form a modular unit of N reactors, the outlet of the $(N-1)^{th}$ electrolytic unit being fluidly connected to the inlet of the $N^{th}$ electrolytic unit, the number N being selected in accordance with a volume of water to be treated.

10. The electrolytic apparatus assembly of claim 1, wherein the water contains *Legionella* and/or *E. coli* bacteria.

11. The electrolytic apparatus assembly of claim 1, further comprising a flow control module for maintaining a transition or turbulent flow regime in the reactor.

12. The electrolytic apparatus assembly of claim 11, wherein the flow control module is configured to control the flow regime in the treatment loop and through the at least one vertical electrolytic unit in order to optimize the water treatment, and to maintain an optimal flow rate when performing electrolysis in the reactor.

13. The electrolytic apparatus assembly of claim 1, wherein the pump unit is configured to be modified in size in order to adjust a flow rate in the treatment loop, and through an automatically controlled and modulating valve operatively connected to the inlet.

14. The electrolytic apparatus assembly of claim 1, further comprising a unit of automated ON/OFF valves for directing the water in the treatment loop so that the water effectively passes multiple times through the at least one vertical electrolytic unit, until the treatment is completed.

15. A method for the electro-disinfection of water extracted from a cooling tower containing bacteria, the method comprising the steps of:
   a) injecting the water to be treated into the electrolytic apparatus assembly as defined in claim 1, the water having previously circulated in the cooling tower prior to be injected into the electrolytic apparatus assembly;
   b) performing an electrolytic treatment of the water circulating into the electrolytic unit assembly for at least partially kill the bacteria; and
   c) optionally, re-injecting the water once treated into the cooling tower.

16. The method of claim 15, wherein the bacteria are *Legionella* and/or *E. coli*.

* * * * *